April 10, 1945.  F. PLECKI  2,373,412
SHOP TRUCK CONSTRUCTION
Filed Nov. 20, 1942
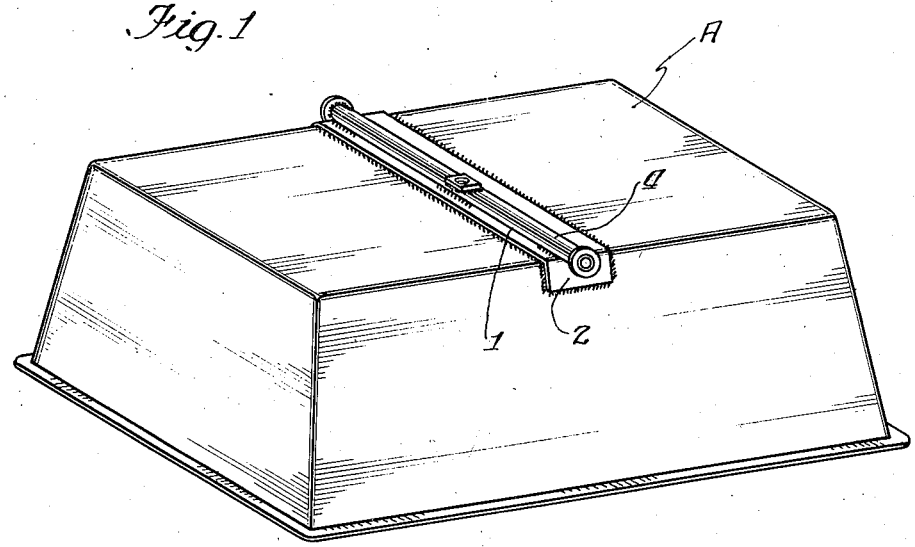
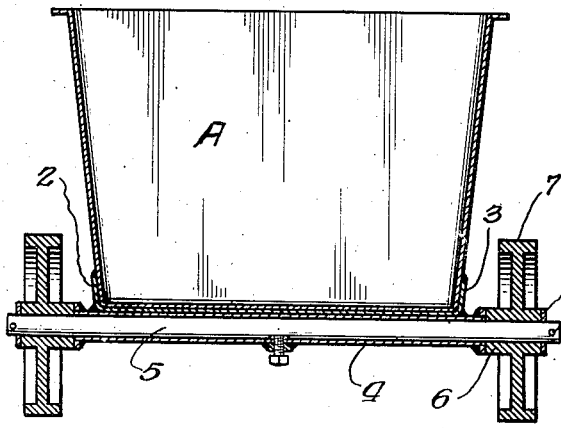
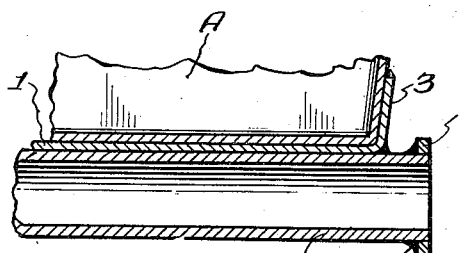
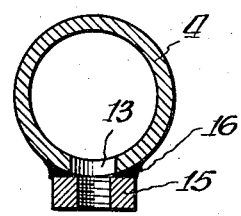
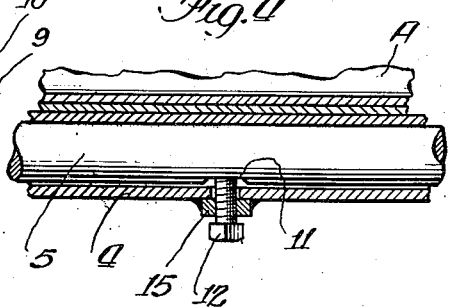
Inventor:
Frank Plecki
By: Leslie W. Fricke
Attorney Patented Apr. 10, 1945

2,373,412

UNITED STATES PATENT OFFICE 2,373,412

SHOP TRUCK CONSTRUCTION

Frank Plecki, Chicago, Ill., assignor to The Globe Company, Chicago, Ill., a corporation of Illinois Application November 20, 1942, Serial No. 466,533

2 Claims. (Cl. 280—51)

My invention relates to an improvement in the construction of shop trucks of the character widely employed in packing houses and the like for the transportation of meat or other food products where the question of cleanliness is important.

The type of truck to which my invention appertains generally is of the two-wheel type having suitable feet or stops adjacent the ends, such, for example, as rollers.

An object of my invention is to provide a shop truck having a metal body with axle housing means whereby the means may be secured to the exterior of the truck body without causing any dents or crevices or projections on the interior of the body.

Another object of the invention is to provide a sheet metal body of a shop truck with an axle supporting and reenforcing means which is welded to the body and which is provided with adequate bearing surfaces for the wheel hubs.

A further object of the invention is to provide novel means for securing a loose axle in a housing against endwise and rotative movement.

The above, other and further objects of my invention will be apparent from the following description and accompanying drawing.

A suitable embodiment of my invention is shown, by way of example, in the accompanying drawing, in which—

Figure 1 is a perspective view of a shop truck body, in up-side-down position, with the axle securing means welded in place;

Figure 2 is a transverse sectional view taken along the axis of the axle and showing details of construction;

Figure 3 is an enlarged transverse sectional view through the axle housing and nut;

Figure 4 is a fragmentary view, partially in section and partially in elevation, of the axle, axle housing and set screw arrangement for holding the axle in place, and Figure 5 is a fragmentary vertical sectional view through one end of the axle housing showing one manner of increasing bearing surface area for a wheel hub.

The drawing will now be explained.

A truck body A of metal has secured to it along the outer surface of its bottom a plate 1 with the length of the plate extending crosswise of the body. The ends 2 and 3 of the plate are bent upwardly against the side walls of the body, and the plate is welded to the body by welding along the margins of the plate and the upturned ends, thus making the plate an integral part of the body.

Welded to the plate 1 is a pipe or cylindrical member 4, constituting an axle housing, and this housing extends lengthwise of the plate and is so arranged that its ends project outwardly of or beyond the upturned ends of the plate 1 as may be noted in Figures 2 and 5.

Inasmuch as the axle 5 is non-rotatively supported within the housing 4, the material of which the housing is made may be thinner than otherwise. In order to provide suitable bearing areas at the ends of the housing for engagement by the ends of the hubs 6 of the wheels 7, I weld washers or rings 8 about the end extremities of the housing with the outer surface of such rings flush with the ends of the housing. In this manner bearing area of adequate amount is attained. These washers are welded as indicated at 9ª to be permanently secured to the housing.

The axle 5 is inserted in the housing 4 with its ends projecting beyond the ends of the housing, to receive the wheels 7. The wheels 7 are shown as freely rotatable on the axle, being retained against displacement by means of cotter pins 9 through the ends of the axle and resting against washers 10 at the outer ends of the hubs. With this construction the wheels may be quickly applied or removed for repair or replacement.

To maintain the axle 5 motionless within the housing I prefer to form a recess 11 somewhere in mid-length of the axle and employ a set screw 12 for entering the recess. Referring to Figures 3 and 4, it will be noted that the housing 4 is bored at 13. In order to provide sufficient holding surface for the set screw I weld a nut 15 to the exterior of the housing with the threaded opening of the nut in register with the bore 13 of the housing, the nut being welded as at 16. Thus when the set screw 12 is inserted as shown in Figure 4, and tightened against the axle sufficient engagement between the nut and the screw is attained to hold the set screw against dislodgement by vibrations occurring in normal use of the truck.

As before stated, the housing is of a construction having a thinner wall than a housing would have if the axle were rotative within the housing. The combination of the nut and the housing affords ample support for the set screw.

It will be observed that by my invention I have provided axle mounting means for a sheet metal shop truck in which the axle housing is welded in place against the plate and which plate in turn is welded not only to the bottom of the truck body but to its side walls, utilizing the bent ends of the plate for preventing any tendency of endwise shift occurring in the plate, which would otherwise be restrained by the weld.

Furthermore, by reason of the use of the washers 8 suitable bearing surface for the wheel hubs is provided where the radial thickness of the wall of the housing is reduced to a minimum. The use of the welded nut provides ample security for the set screw so that my invention makes it possible to secure an axle supporting arrangement with adequate strength for the purpose intended and in which the weight of the material may be reduced to a minimum.

I wish it to be understood that my invention is not limited to the specific construction shown and described, except so far as certain of the claims may be so limited, as it will be apparent to those skilled in the art that changes in the construction and arrangement shown may be made without departing from the principles of my invention.

I claim:

1. In combination with a sheet metal body of a shop truck, an axle supporting structure comprising a plate engaging the exterior of the bottom of the body throughout substantially the entire width of said bottom and welded thereto with its length crosswise of the body, said plate having a substantial width longitudinally of the body and having its ends bent upwardly against and welded to the side walls of the body above the body bottom, and an elongated tubular axle housing welded to said plate lengthwise thereof with its ends projecting outwardly of the bent ends of said plate.

2. In combination with a sheet metal body of a shop truck, an axle supporting structure comprising a plate welded to the exterior of the bottom of the body with its length crosswise of the body having a substantial width longitudinally of the body and with its ends bent against and welded to the side walls of the body, a thin walled tubular axle housing welded to said plate lengthwise thereof with its ends projecting outwardly of the bent ends of said plate, washers welded at the extremities of said housing and about the same to afford hub bearing surfaces of greater areal extent than that afforded by the housing, a nut welded to said housing between its ends, said housing being bored in register with the threaded opening of the nut, and a set screw extending through the nut and bore to engage an enclosed axle to prevent endwise shift of the same.

FRANK PLECKI.